May 29, 1928.   1,671,565
J. ASTROM
PUMP
Filed July 12, 1924
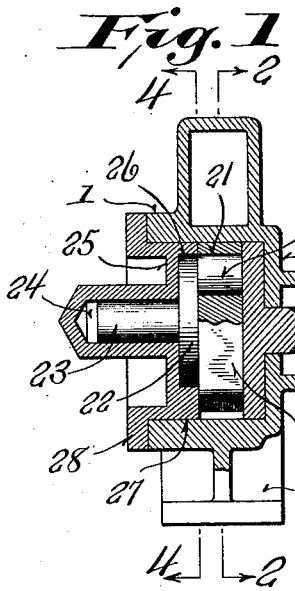
Fig. 1
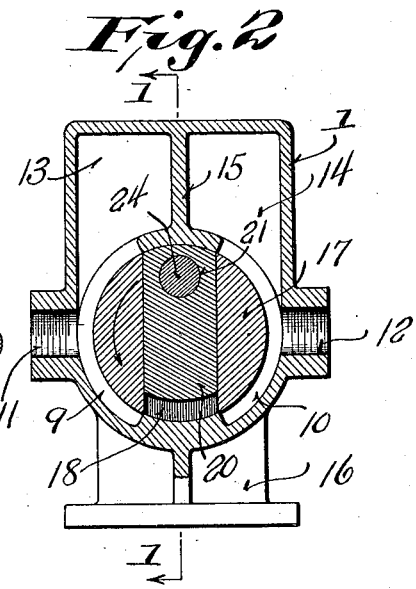
Fig. 2
Fig. 3
Fig. 4
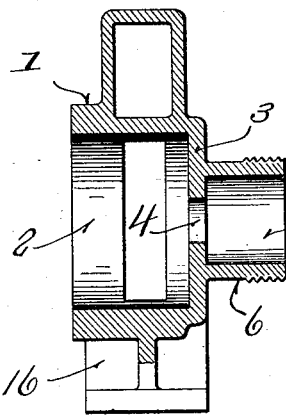
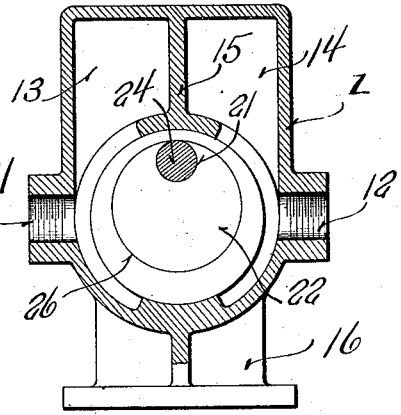
Inventor:
John Astrom Patented May 29, 1928.

1,671,565

UNITED STATES PATENT OFFICE.

JOHN ASTROM, OF FORT WAYNE, INDIANA, ASSIGNOR TO FORT WAYNE ENGINEERING & MANUFACTURING CO., OF FORT WAYNE, INDIANA.

PUMP.

Application filed July 12, 1924. Serial No. 725,632.

This invention relates to pumps.

Objects of this invention are to provide a pump for liquids, which, although made with a very small piston displacement still retains all the good qualities experienced in a pump of large capacity.

Further objects are to provide a pump which has a very small clearance space at the end of the piston travel, to provide a pump which produces a good suction, and to provide inlet and outlet ports of very large size as compared with the area of the piston to permit complete filling of the cylinder even at high speeds of the pump.

Further objects are to provide a pump of rotary type which, although driven at a high speed, is free from vibration, as all of the parts are evenly balanced, and to provide a rotary pump in which a minimum of wear occurs.

An embodiment of the invention is shown in the accompanying drawing, in which:—

Figure 1 is a vertical sectional view through the pump.

Figure 2 is a transverse section on the line 2—2 of Figure 1.

Figure 3 is a view corresponding to Figure 1 showing the housing with the other portions detached.

Figure 4 is a sectional view on the line 4—4 of Figure 1.

A housing 1 is provided which has a cylindrical bore 2 open at one end, but closed by a wall 3 at the other end. The wall 3 is provided with a circular aperture 4 concentric with bore 2 and also concentric with a stuffing box 5 formed by the annular extension 6 of the housing 1. The extension 6 is threaded at its outer part and receives a cap 7 whereby a gland 8 is forced into the stuffing box 5 for the purpose of packing a shaft passing therethrough in the usual manner. In the bored portion 2 of the housing 1, and spaced some distance from the wall 3, are two opposed port openings 9 and 10 which on one side establish communication with opening 11 and with cushion chamber 13 and on the opposite side establish similar communication with opening 12 and cushion chamber 14. Said cushion chambers are formed by an extension of housing 1, and are separated by a wall 15. The housing 1 is supported by a suitably arranged extension 16.

A rotor having a cylindrical portion 17 with a rectangular slot 18 extending into it at one end, and a shaft portion 19 protruding from it at the opposite end, is fitted within the cylindrical bore 2 of housing 1 in a closely fitted slidable contact with the bore and wall 3, and the shaft 19 thereof extends through aperture 4 and stuffing box 5. The slot 18 is in line with the housing port openings 9 and 10.

Into the slot 18 of the rotor a piston 20 of rectangular cross-section corresponding to the slot 18 is fitted in slidable contact therewith. The cross section of the piston corresponds to that of the slot, but its length is shorter than the length of the slot in accordance with the stroke of the pump. The end faces of piston 20 are of a circular shape to correspond to the curvature of the bore 2 of the housing 1. The piston 18 is further provided with a circular hole 21 at one end.

A drag crank having a cylindrical portion 22 and a shaft portion 23 has a crank pin 24 which fits into the circular hole 21 of the piston 20. The shaft portion 23 of the drag crank is fitted into the cylindrical bore 24 of the head 25. This head has a second cylindrical bore 26 for the purpose of carrying therein the cylindrical portion 22 of the drag crank in slidable contact. The head 25 has a portion 27 closely fitted into the housing bore 2 and has a flange 28 adapted to be bolted against the housing 1 in sealed connection therewith. The distances or proportions of all the parts described are such that when assembled as shown, the interior of the bore 2 of housing 1 is completely filled except for the space at either or both ends of the piston 20.

It will now be observed that, as plainly shown by Figures 1 and 4, the cylindrical bores 24 and 26 of the head 25 are not concentric with bore 2 of the housing 1, but are offset vertically an amount equal to one half of the difference between the diameter of the bore 2 and the length of the piston 20. As a consequence the rotor shaft 19 and the drag crank shaft 23 rotate on offset centers. When, therefore, a rotary motion is imparted to rotor shaft 19, the piston 20, being guided in slot 16 of the rotor, is forced to rotate, and since the crank pin 24 of the drag crank is held in the hole 21 of the piston, the drag crank is also forced to rotate. Due to the offset of the two shafts mentioned, the piston 20 will have a sliding motion in slot 18 relative to the rotor of twice the amount of the offset between the two shafts for every half turn of the rotor, and will slide from one extreme position in slot 18 to the other and return to its original position during every complete turn of the rotor.

Starting from the position of parts shown in Figure 2 and rotating the rotor in the direction of the arrow, the piston 20 being in contact with the wall of the bore 2 of casing 1 will gradually be forced towards the center of the rotor and liquid entering the pump through opening 11 will be drawn into the recess thus formed in the rotor through port 9. When one half turn has been completed the piston has passed the center of the rotor and traveled to the opposite extreme position and at this point the unslotted part of the rotor closes communication between the cylinder 18 and the port 9 thus trapping the liquid drawn into the rotor. As the rotation proceeds the piston performs the same motion in the opposite direction thereby displacing the liquid through port 10 and opening 12 out of the pump. While the described action takes place at one end of the piston the opposite end operates in an identical manner but one half turn in advance. The opening and closing of communication between piston and ports is done by the unslotted part of the rotor which takes the place of valves in the ordinary pump, and the proportion of width of slot 18 and length of ports 9 and 10 is such that the rotor at all times prevents communication between the inlet and discharge sides of the pump.

It is to be noted that the piston is not operated by contacting with the inner surface of the bore 2 of the housing in the manner of a cam, but is operated positively by means of the crank pin 24 and thus wear and uncertain action of the piston and rotor due to this usual cause is wholly eliminated.

It will further be observed that the rotor is symmetrical about the axis of its shaft and therefore perfectly balanced. Also that the piston 20 is located centrally in regard to the shaft 22 of the drag crank and held in that position by pin 21 which fills the hole 19 completely. The drag crank and piston therefore also form a perfectly balanced unit about the shaft 23. The moving parts of the pump are therefore completely balanced and will give rise to no vibrations regardless of the speed at which the pump is operated.

While the piston moves in the rotor it is in communication with the ports and at the quarter turn positions where its relative speed is the highest the area of such communication is the full projected area of the piston. This large port area permits the pump to be operated at a very high rate of speed without wire-drawing or obstruction to the flow of liquid into the rotor.

The pump having one complete suction and discharge stroke at each end for such revolution makes it correspond in its action to a double-acting pump which, combined with the high permissible speed of rotation gives a very uniform flow of liquid.

The piston at the completion of each discharge stroke comes in sliding contact with the bore of the housing which practically eliminates all clearance space and insures a powerful suction due to the fact that all the liquid drawn in by the piston is displaced on each stroke.

It is thus plain from the above that all the purposes of this invention have been accomplished in a very simple manner and that the pump can be built in a very small size without the loss of any of the characteristic features thereof.

A pump constructed in accordance with this invention and of very small size weighing approximately six pounds and having a two inch bore in the housing was found at 1200 R. P. M. to have 100% volumetric efficiency. This pump delivered about sixty-five gallons of liquid per hour with a suction of twenty-five inches of mercury against a discharge pressure up to one hundred pounds a square inch. This test showed conclusively that the pump had the remarkable property of perfect volumetric efficiency, of high suction and freedom from destructive vibration although of small sizes and of the rotary type.

Although the invention has been described in considerable detail, it is to be understood that the invention may be variously embodied and is, therefore, to be limited only as claimed.

I claim:

1. A pump comprising a casing having a cylindrical inner portion and a surrounding outer portion joined at their lower sides, an internal wall joining the upper side of the cylindrical portion with the upper part of the outer portion and dividing the outer portion exterior to the cylindrical portion into two chambers, said cylindrical portion having elongated ports opening into said chambers, a cylindrical rotor mounted within said cylindrical portion and having a diametrically located slot, a plunger slidably fitting said slot, a cap for said casing having a bore offset from the center line of said rotor, and a crank having an extension revolubly fitting said bore and having a pin fitting within said plunger.

2. A rotary pump comprising a cylindrical casing, a rotor mounted therein and having a shaft, said rotor having a transverse aperture therein, a plunger fitting said aperture, and a crank having a shaft and having a crank pin fitted within said plunger, the shaft of said crank being offset from the shaft of said rotor, said rotor being balanced about the rotor shaft, and said crank, crank pin and plunger being balanced about said crank shaft.

3. A rotary pump comprising a cylindrical casing, a cylindrical rotor mounted within said casing, and having a driving shaft projecting outwardly through said casing, said rotor having a transverse aperture therethrough, a plunger fitting said aperture and being of slightly less length than the length of said aperture, a disk having a projecting central shaft offset with reference to said first mentioned shaft, a crank pin projecting from said disk and fitting said plunger, whereby when said first mentioned shaft is rotated approximately simple harmonic motion is imparted to said plunger, said casing having an elongated inlet and outlet opening formed in opposite sides thereof.

4. A pump comprising a cylindrical casing, a cylindrical rotor fitting within said casing and having an imperforate wall on one face and a diametrically arranged slot passing through its other face, said casing having a wall partially closing said slot and having a cylindrical recess formed therein with the center of the recess offset with respect to the center of the rotor, a solid disk of circular contour fitting said recess and having a flat face forming a continuation of the inner face of said wall and completing the closing of the slot, a plunger slidably mounted within said slot and of slightly less length than said slot, and a pin eccentrically carried by said disk and fitting with an aperture formed in said plunger.

5. A pump comprising a cylindrical casing having projecting upper portions, a partition wall separating said projecting portions into two cushioning chambers, said cylindrical casing having elongated slots communicating with said chambers, and said casing having inlet and outlet openings communicating with said chambers, a rotor mounted within said cylindrical casing and having an imperforate outer face and having a transversely slotted inner face, a piston mounted within the slot in said inner face and having an aperture therein, a closure for one side of said cylindrical casing having a revolubly mounted disc therein provided with a pin fitting within said piston, said disc being eccentrically mounted with reference to said rotor, said rotor being balanced about its center of rotation and said piston and pin being balanced about the axis of said disc.

In testimony that I claim the foregoing I have hereunto set my hand at Fort Wayne, in the county of Allen and State of Indiana.

JOHN ASTROM.